United States Patent
Zhang et al.

(10) Patent No.: US 11,023,159 B2
(45) Date of Patent: Jun. 1, 2021

(54) METHOD FOR FAST RECOVERING OF DATA ON A FAILED STORAGE DEVICE

(71) Applicant: LENOVO Enterprise Solutions (Singapore) PTE. LTD., New Tech Park (SG)

(72) Inventors: Caihong Zhang, Shanghai (CN); Shunrong Hu, New South Wales (AU); Da Ke Xu, Shanghai (CN); Xiaole Shang, Shanghai (CN); Zhao Li Wang, Shanghai (CN); Li Jun Gu, Shanghai (CN)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 0 days.

(21) Appl. No.: 16/536,669

(22) Filed: Aug. 9, 2019

(65) Prior Publication Data
US 2020/0050373 A1    Feb. 13, 2020

(30) Foreign Application Priority Data
Aug. 9, 2018    (CN) .......................... 201810904110.9

(51) Int. Cl.
*G06F 3/06* (2006.01)
*G06F 11/20* (2006.01)

(52) U.S. Cl.
CPC .............. *G06F 3/065* (2013.01); *G06F 3/067* (2013.01); *G06F 3/0619* (2013.01); *G06F 3/0652* (2013.01); *G06F 3/0665* (2013.01); *G06F 3/0683* (2013.01); *G06F 11/2094* (2013.01)

(58) Field of Classification Search
CPC ........ G06F 3/065; G06F 3/0619; G06F 3/067; G06F 3/0683; G06F 3/0665; G06F 11/2094; G06F 3/0652
USPC ....................................................... 711/162
See application file for complete search history.

(56) References Cited

U.S. PATENT DOCUMENTS

| | | | |
|---|---|---|---|
| 9,021,296 B1 * | 4/2015 | Kiselev | G06F 3/0647 714/6.23 |
| 2016/0335166 A1 * | 11/2016 | George | G06F 11/2094 |
| 2018/0292995 A1 * | 10/2018 | Tal | G06F 3/0608 |

* cited by examiner

*Primary Examiner* — Hua J Song
(74) *Attorney, Agent, or Firm* — Kunzler Bean & Adamson; Bruce R. Needham

(57) ABSTRACT

A method for recovering data on a failed storage device includes detecting that a first storage device has a failure, creating a simulated management module where the simulated management module linked with a second storage device, writing a replica of at least some of the data as stored in the first storage device to a second storage device, creating a permanent management module and deleting the simulated management module.

17 Claims, 14 Drawing Sheets

METHOD FOR FAST RECOVERING OF DATA ON A FAILED STORAGE DEVICE

CROSS-REFERENCE TO RELATED APPLICATIONS

This patent application claims priority to China Patent Application No. 201810904110.9 filed on Aug. 9, 2018 for Caihong Zhang et al., the entire contents of which are incorporated herein by reference for all purposes.

FIELD

The subject matter disclosed herein relates to distributed data storage technologies using computer networks, and in particular recovery of failed data storage devices in the distributed data storage system.

BACKGROUND

Enterprises and consumers today face the problem of storing and managing an ever-increasing amount of data on non-volatile data storage systems such as hard disk drives. One promising direction in computer storage systems is to harness the collective storage capacity of massive commodity computers to form a large distributed data storage system. Examples of commercially available distributed data storage systems include Ceph which is capable of block, object, and file storage, and which enables multiple Ceph storage nodes (servers) to cooperate to present a single storage system that easily handles many petabytes, and increase both performance and capacity at the same time. Another example is Intel® Rack Scale Design ("RSD") which is a logical architecture disaggregating hardware, such as computing, storage and network resources, from preconfigured servers and deploys them in sharable resource pools.

When designing such distributed data storage systems, an important factor to consider is data reliability. Once data is stored a user typically does not want or cannot afford to lose any of the stored data. Unfortunately, the data management chain is prone to failures at various links that can result in permanent data loss or a temporary unavailability of the data. For example, any one of a number of individual components of a massive distributed data storage system may fail for a variety of reasons. Hard drive failures, computer motherboard failures, memory problems, network cable problems, loose connections (such as a loose hard drive cable, memory cable, or network cable), power supply problems, and so forth can occur leaving the data inaccessible.

As a result, there have been developed various data recovery mechanisms for distributed data storage systems should one or more storage device fail, doesn't matter if it is a physical device or a virtual device. One typical data recovery approach works in the following way: when a disk failure happens, the bad disk is taken out from a cluster in a distributed data storage system, and the system begins rebalancing and copying a replica of data in the failed disk to other available storage devices across the whole storage cluster. After a new storage device is replaced, the distributed data storage system will perform rebalancing again to keep all disks across the cluster equally utilized. Such an approach is low on bandwidth efficiency and processing power efficiency since it takes a long time and substantial network bandwidth is required to perform rebalancing twice. This severely impacts the whole storage cluster performance.

BRIEF SUMMARY

A method for recovering data on a failed storage device includes detecting that a first storage device has a failure, creating a simulated management module where the simulated management module linked with a second storage device, writing a replica of at least some of the data as stored in the first storage device to a second storage device, creating a permanent management module and deleting the simulated management module.

A program product for recovering data on a failed storage device includes a computer readable storage medium that stores code executable by a processor. The executable code includes code to detect that a first storage device has a failure, create a simulated management module where the simulated management module is linked with a second storage device, write a replica of at least some of the data as stored in the first storage device to a second storage device, create a permanent management module, and delete the simulated management module.

An apparatus for recovering data on a failed storage device includes a processor and a memory that stores code executable by the processor to detect that a first storage device has a failure, create a simulated management module where the simulated management module is linked with a second storage device, write a replica of at least some of the data as stored in the first storage device to a second storage device, create a permanent management module and delete the simulated management module.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
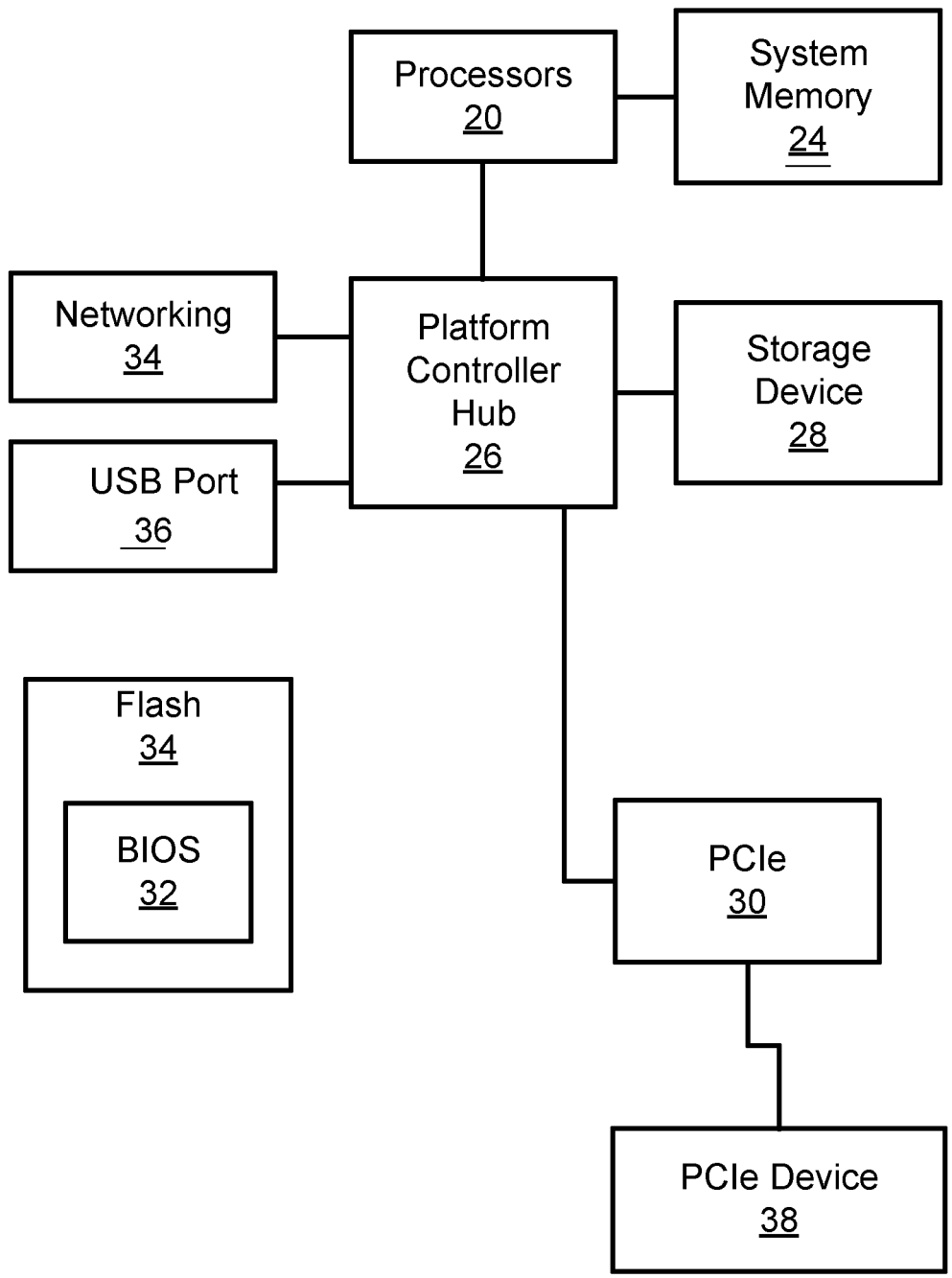
FIG. 1 is a schematic block diagram illustrating one embodiment of a computing device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Accordingly, the present invention, in one aspect, is a method for recovering data on a failed storage device. The method contains the steps of detecting that a first storage device has a failure; creating a simulated management module which links to a second storage device; writing a replica of at least some of the data as stored in the first storage device to the second storage device; creating a permanent management module; and deleting the simulated management module.

Significantly, embodiments provided by the present invention reduce the amount of rebalancing required in the storage cluster of the data storage system when a failure of a storage device took place. In some embodiments, the rebalancing process can be completed with much less disturbance to the overall cluster performance, since the I/O requests to the failed device will be directed to other devices via the virtual pointers, and the data backfilling to a replacement storage device will only be conducted when the cluster load is not high. In some other embodiments, a virtual disk which is tied to physical storage devices can be mounted to different virtual disk managers at different time of recovery process so that instead of data transfer across different nodes in the cluster, the data transfer takes place only in a same node, for example going through a local computer bus, which saves network bandwidth and results in faster operation. Lastly, the proposed methods use simple approaches, which are not likely to cause system shock and failure. The map of the cluster as well as virtual disk managers are all kept the same, which avoids additional, unnecessary calculation and data moving.

A method for recovering data on a failed storage device includes detecting that a first storage device has a failure, creating a simulated management module where the simulated management module linked with a second storage device, writing a replica of at least some of the data as stored in the first storage device to a second storage device, creating a permanent management module and deleting the simulated management module.

In some embodiments, the method includes creating a virtual pointer associated with the simulated management module where the virtual pointer points to a third storage device which stores the replica of said data. In further embodiments, writing a replica of at least some of the data includes the replica of said data from the third storage device being written to the second storage device. In further embodiments, writing a replica of at least some of the data in response to a communication network connected between the second storage device and the third storage device having a workload less than a threshold. In other embodiments, the second storage device and the third storage device reside in different hosts of a storage cluster, wherein the first storage device and the second storage device reside in a same host. In other embodiments, creating the virtual pointer is performed before the writing a replica of at least some of the data as stored in the first storage device to a second storage device and the method includes deleting the virtual pointer if an entirety of the replica of said data associated with the virtual pointer has been written to the second storage device in the writing step.

In some embodiments, the method includes linking a fourth storage device with the permanent management module. In further embodiments, the method includes migrating the replica of said data from the second storage device to the fourth storage device after writing the replica of said data to the second storage device has commenced. In other embodiments, the method includes writing the replica of said data from a third storage device, which stores the replica of said data, to the fourth storage device after the simulated management module is deleted. In other embodiments, the simulated management module and the permanent management module correspond to Object Storage Daemons ("OSDs") and the first storage device and the second storage device correspond to Placement Groups ("PGs").

In some embodiments, the method includes creating a virtual disk manager associated with the second storage device, where the writing the replica of said data includes copying the replica of said data stored in a third storage device to the virtual disk manager via the simulated management module and then to the second storage device. In a further embodiment, the simulated management module and the permanent management module reside in different nodes and the method includes linking the virtual disk manager to the simulated management module, and copying the replica of said data includes transmitting the replica of said data from the third storage device to the virtual disk manager via an existing management module associated with the third storage device and then the simulated management module. In other embodiments, the method includes unlinking the virtual disk manager from the simulated management module in response to completion of transmitting the replica of said data. In other embodiments, the method includes linking the virtual disk manager to the permanent management module in response to completion of unlinking the virtual disk manager from the simulated management module.

In some embodiments, the simulated management module and the permanent management module reside in a same node and the method includes linking the virtual disk manager to the permanent management module, linking the third storage device to the simulated management module, and copying the replica of said data includes transmitting the replica of said data from the third storage device to the virtual disk manager via the simulated management module associated with the third storage device and then the permanent management module. In a further embodiment, the method includes unlinking the third storage device from the simulated management module in response to completion of transmitting the replica of said data from the third storage device to the virtual disk manager. In other embodiments, deleting the simulated management module is in response to completion of unlinking the third storage device from the simulated management module.

A program product for recovering data on a failed storage device includes a computer readable storage medium that stores code executable by a processor. The executable code includes code to detect that a first storage device has a failure, create a simulated management module where the simulated management module is linked with a second storage device, write a replica of at least some of the data as stored in the first storage device to a second storage device, create a permanent management module, and delete the simulated management module.

In some embodiments, the program product includes code to create a virtual pointer associated with the simulated management module, the virtual pointer pointing to a third storage device which stores the replica of said data.

An apparatus for recovering data on a failed storage device includes a processor and a memory that stores code executable by the processor to detect that a first storage device has a failure, create a simulated management module where the simulated management module is linked with a second storage device, write a replica of at least some of the data as stored in the first storage device to a second storage device, create a permanent management module and delete the simulated management module.

FIG. 1 is a schematic block diagram of a computing device. The computing device includes one or more processors 20 in communication with system memory 24 and a platform controller hub 26. The platform controller hub 26 is connected to a storage device 28, which includes non-volatile computer readable storage media. The platform controller hub 26 is also connected to a networking device 34, which is connected to a computer network, and to a universal serial bus ("USB") 36, which may be used for connection to other devices, including peripheral devices, such as a keyboard, a mouse, a display, etc. The platform controller hub 26 is connected to a peripheral component interconnect express ("PCIe") bus 30, which is connected to a PCIe device 38. The computing device may be used in the distributed data storage systems described below.

Figure 2:
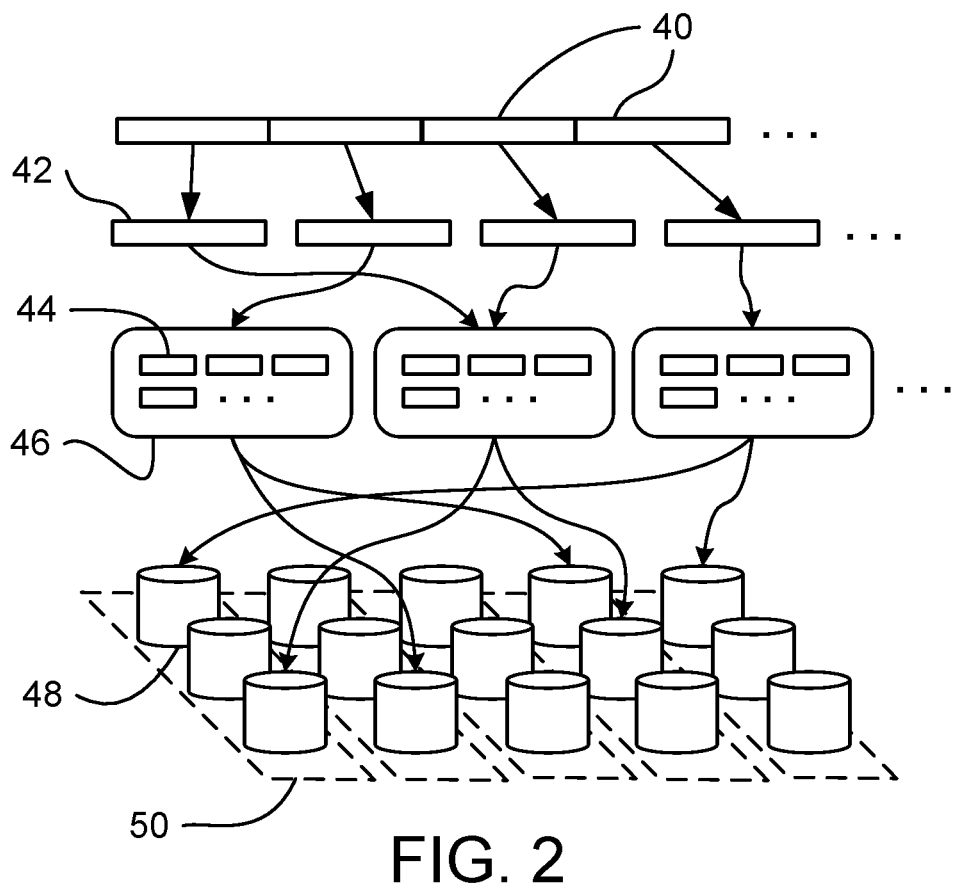
FIG. 2 is a schematic block diagram illustrating one embodiment of architecture of a distributed data storage system.

Turning now to FIG. 2, which shows in general the architecture of one type of distributed data storage systems according to an embodiment of the invention. One example of commercially available system that has an architecture similar to the one shown in FIG. 2 is Ceph®, a software storage platform. In FIG. 2, the top level of data storage is files 40 where each file 40 is a collection of contiguous data, named from the perspective of clients (not shown) of the distributed data storage system. However, the files are stripped into objects 42 which are the lowest level of manageable units of the distributed data storage system. When the objects 42 are placed in a cluster, the objects 42 are mapped into Placement Groups ("PGs") 44, and those PGs 44 are mapped onto Object Storage Devices ("OSDs") 48. The mapping involves linking two objects together so that they are connected in terms of data transmission.

The storage cluster is a heterogeneous group of computing and storage resources (e.g. bare metal servers, virtual machines), where each member of the cluster is either working as a monitor (not shown) or an OSD 48. The OSD 48 is the object storage daemon for the distributed data storage system which is responsible for storing objects 42 on a local file system and providing access to them over a network (not shown). The OSD 48 is therefore also called a management module which links to storage device(s). Typically, an OSD 48 corresponds to a local hard disk (not shown). The distributed data storage system also contains multiple pools 46 each of which is a set of PGs 44 among which objects 42 are distributed. A pool 46 can also be seen as a virtualized storage partition that the client of the distributed data storage system may use to hold their data. Lastly, an underlying data managing algorithm (not shown), e.g. CRUSH in Ceph) builds a map of the cluster, and uses the map to pseudo-randomly store and retrieve data in OSDs 48 with a uniform distribution of data across the cluster. The algorithm also intelligently monitors OSD failures, report and update the map. The algorithm separate replicas of objects 42 across different failure domains 50 while still maintaining the desired distribution, and in each failure domain 50 there is a plurality of OSDs 48. The above architecture of distributed data storage system is well-known to persons skilled in the art and will not be described in further details here.

Figure 3:
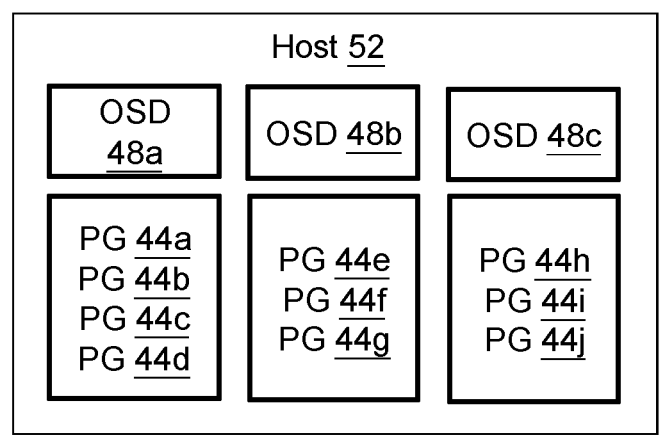
FIG. 3 is a schematic block diagram illustrating one embodiment of the structure of a host containing OSDs and PGs in the distributed data storage system of FIG. 2.

Turning now to FIG. 3, which shows Host 52 which contains some of the OSDs and PGs similar to those shown in FIG. 2. Host 52 is a computing device, and Host 52 contains three OSDs 48a, 48b, 48c which run on Host 52. OSD 48a has four PGs assigned thereto, namely PG 44a, PG 44b, PG 44c and PG 44d. OSD 48b has three PGs assigned thereto, namely PG 44e, PG 44f, and PG 44g. OSD 48c has three PGs assigned thereto, namely PG 44h, PG 44i, and PG 44j. Note that host 52 typically is not the only host in the distributed data storage system, but there are often other hosts which have a similar structure as Host 52.

Figure 4:
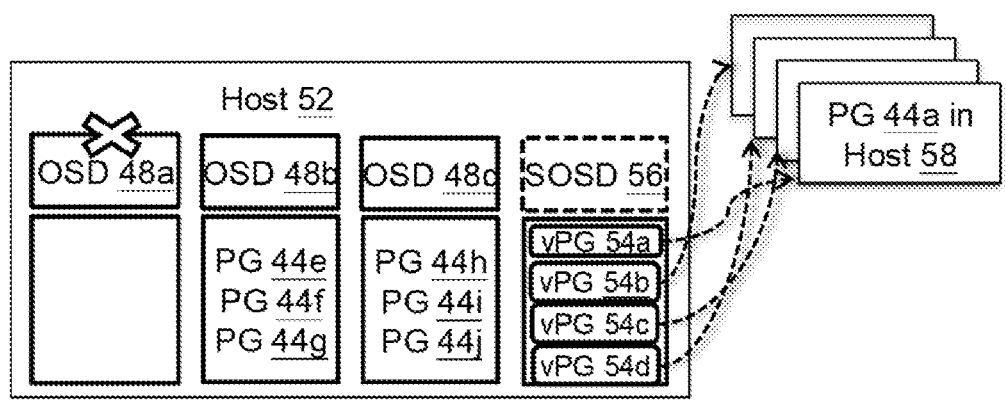
FIG. 4 is a schematic block diagram illustrating one embodiment of virtual pointers in a simulated OSD in the host of FIG. 3 pointing to resources in external hosts.
Figure 8:
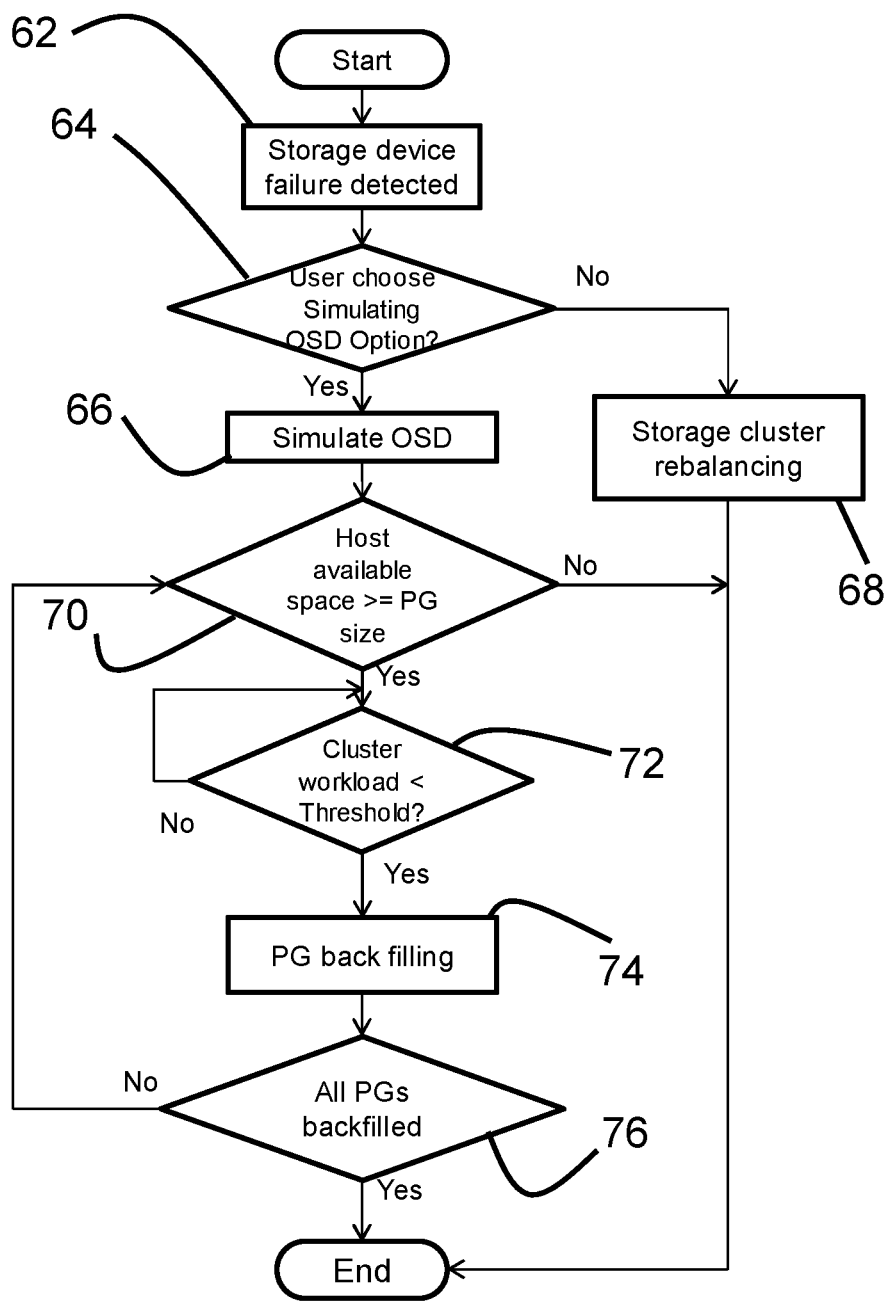
FIG. 8 is a schematic flow chart diagram illustrating one embodiment of a method of how the simulated OSD is backfilled as in FIGS. 4-7.
Figure 9:
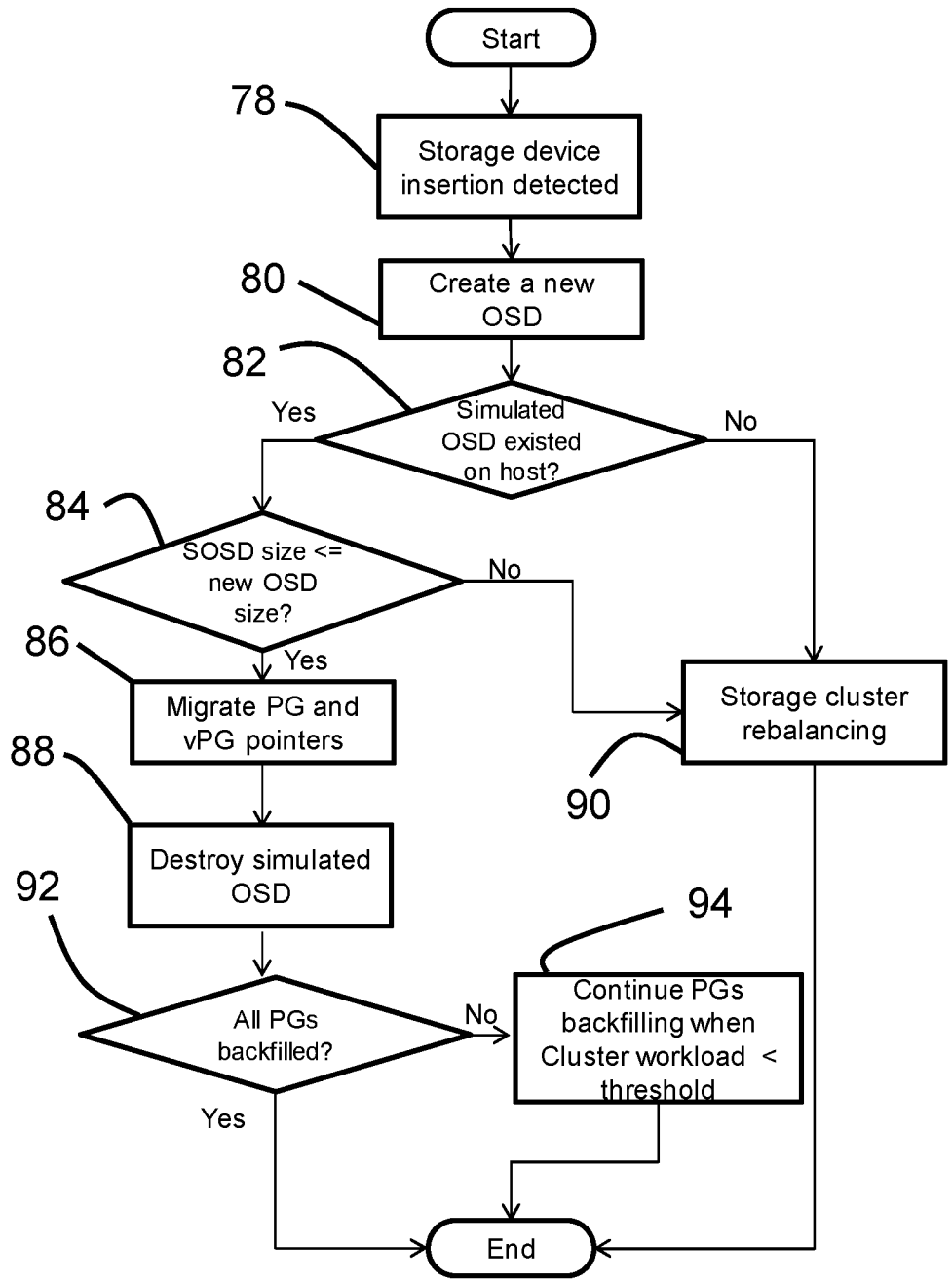
FIG. 9 is a schematic flow chart diagram illustrating one embodiment of a method flow of how the new OSD is installed and filled with data from the simulated OSD as in FIGS. 4-7.

FIGS. 4-7 illustrate changes of the components in Host 52 where a disk failure has happened, and the corresponding data recovery mechanism is illustrated in FIGS. 8-9. In FIG. 8, the recovery process starts in Step 62 when there is physical storage device failure detected by the distributed data storage system. The failed physical storage device is assumed to be associated with OSD 48a which in FIG. 4 is illustrated as disabled. When OSD 48a failed as a result of its associated physical storage device failed, in Step 64 the user (not shown) is prompted to choose the simulating OSD option. Such a user may be an IT administrator of the distributed data storage device. The user may be prompted for example by an on-screen notification to give an instruction, or the user's choice may be automatic based on a default setting. If the user does not choose to use Simulating OSD option, then the method proceeds to Step 68 in which the cluster rebalancing is performed in a conventional manner and will not be described in any further detail herein.

However, if the user opts for the simulating OSD option in Step 64, then the method proceeds to Step 66 in which a temporary OSD is simulated, which is SOSD 56 in FIG. 4. SOSD 56 as a simulated management module is created by Host 52 within a very short time, e.g. seconds, and it contains no real data initially, but several virtual pointers vPG 54a, vPG 54b, vPG 54c and vPG 54d. As a result, SOSD 56 takes very small data size, as no data copy is necessary at the outset in contrast with conventional data rebalancing recovery schemes. It should be noted that SOSD 56 is linked to a physical, available storage device (not shown) so that data stored in the storage device can be linked and managed by SOSD 56. On the other hand, vPG 54a, vPG 54b, vPG 54c and vPG 54d is each associated respectively with the previous PGs in the failed OSD 48a, namely PG 44a, PG 44b, PG 44c and PG 44d. Once the virtual pointers vPG 54a, vPG 54b, vPG 54c and vPG 54d are created, then any access request to the previous OSD 48a will be handled by SOSD 56 instead, and each one of vPG 54a, vPG 54b, vPG 54c and vPG 54d may point to a different PG in other host(s) different from the host 52. For example, as shown in FIG. 4 any access request to PG 44a in the failed OSD 48a is handled by SOSD 56 with vPG 54a directing such access request to a PG 44a in Host 58.

After the SOSD 56 is created, the data backfilling is not automatically performed as a next step. Rather, the distributed data storage system has to fulfil certain criterium before the data backfilling is allowed to take place. This is shown in Step 70 in FIG. 8, in which a first determination is to determine whether the available space in Host 52 is larger than or equal to the size of PGs in the failed OSD 48a. Such an available space can be provided by the physical storage device that is linked to SOSD 56 as mentioned above. If Host 52 does not have enough storage space for the data copy of the actual PGs from external hosts (such as Host 58), then there will be no data backfilling conducted before a replacement OSD is installed to substitute for the failed OSD 48a. Rather, the method illustrated in FIG. 8 will directly go to an end. It should be noted that the fact that Host 52 does not have enough storage space is not permanent, as when a new (replacement) storage device is installed in Host 52 to take the position of the failed storage device, Host 52 will have enough space for data backfilling in which case the available space is provided by the new storage device. Depending on whether the available space is partially or wholly on the new storage device or not, the designation of backfilled data will be different, as well be described in more details later.

If Host 52 has enough storage space for the data copy of the actual PGs from external hosts (such as Host 58), then the second determination to be made in Step 72 is to see whether the real-time workload of the storage cluster is below a threshold. If the workload is in fact equal to or higher than the threshold, it means that the storage cluster is too busy to perform any data backfilling which inevitably will impact the cluster performance. The storage cluster then needs to wait, until a time when the workload is lower than the threshold and the cluster becomes idle, and then the data back filling can be carried out in Step 74 to write the replica of data in PG 44a and PG 44b of the failed OSD 48a in SOSD 56. The illustration of data backfilling is provided in FIG. 5, where one can see that the previous virtual pointers vPG 54a and vPG 54b in SOSD 56 have been replaced by actual copy of the data in PG 44a and PG 44b as a result of migrating data for PG 44a and PG 44b (which are replicas of the original data in the failed OSD 48a) from the external host(s). The data backfilling direction is indicated by arrow 60. On the other hand, at the moment shown in FIG. 5 the virtual pointers vPG 54c and vPG 54d are yet to be backfilled with actual data.

After the data backfilling in Step 74 commenced, the system then needs to wait for all PGs in the failed OSD 48a to be filled in to SOSD 56. It is certainly possible that during this period the workload of the storage cluster may become high again and in that case the data backfilling has to be paused, until the workload becomes low. If all PGs in the failed OSD 48a to be filled in to SOSD 56, as is determined in Step 76, then the data backfilling process is finished. Otherwise, the method returns to Step 70 to wait for further time window when the cluster load is low to continue the data backfilling process.

Figure 5:
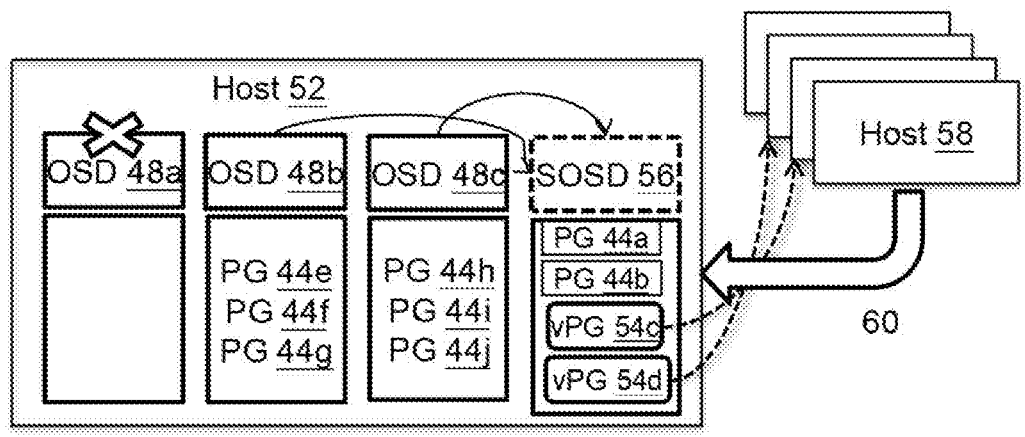
FIG. 5 is a schematic block diagram illustrating one embodiment of virtual pointers in FIG. 4 being gradually backfilled from the external hosts.
Figure 6:
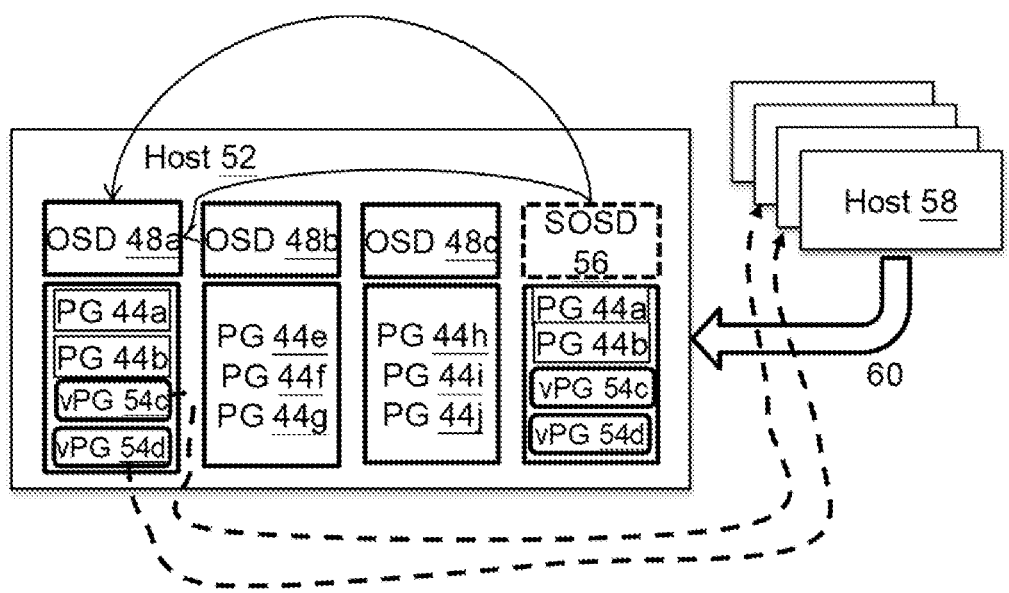
FIG. 6 is a schematic block diagram illustrating one embodiment of both data replication between the simulated OSD and a new OSD within the host of FIG. 5 as well as backfilling from the external hosts.
Figure 7:
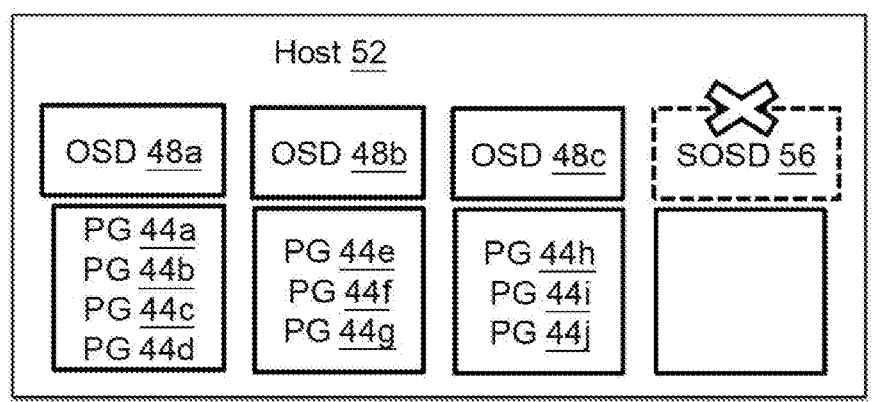
FIG. 7 is a schematic block diagram illustrating one embodiment of deletion of the simulated OSD in the host of FIG. 6 once the new OSD is filled with all the data.

It should be noted that the data at least partially backfilled to the SOSD 56 in FIGS. 5-6 is based on the condition that Host 52 has enough storage space even when a new OSD to replace the failed OSD 48a has not been installed. In other words, the above-mentioned physical storage device linked to SOSD 56 has enough space for at least some of replica of the PGs in the failed OSD 48a. If this is not the case, and any data backfilling need to utilize space on the new storage device to be installed to Host 52, then the Step 74 will be performed on the new storage device when it has been installed.

Turning to FIG. 9, which shows the method of data migration when a new (replacement) physical storage device is installed in Host 52 to take the position of the failed storage device linked to the failed OSD 48a. Note that the method in FIG. 9 can run independently from that in FIG. 8, although there are interactions between the two and also some steps are the same. As a first step 78, the distributed data storage system detects when a new physical storage device (e.g. a hard disk) is inserted into Host 52. Then, in Step 80 the distributed data storage system creates a new OSD for the new storage device which is intended to be permanent, and the new OSD is also indicated using part number 48a in FIG. 6. Next, in Step 82 the distributed data storage system checks if a simulated OSD (i.e. SOSD 56 in FIGS. 4-6) already exists in Host 52.

If a simulated OSD does not exist, then it means that the user did not choose the simulating OSD option, as explained with respect to Step 64 of FIG. 8, and the method proceeds to Step 90 in which the cluster rebalancing is performed in a conventional manner and will not be described in any further details here. If in Step 82 it is determined that SOSD 56 has already been created, then the method proceeds further to Step 84, in which a determination is made as to whether a size of the SOSD 56 is smaller than or equal to that of the new storage device, which is the size of the new OSD 48a. If the method determines that the SOSD 56 is not smaller than or equal to that of the new storage device, (for example in the case when the new OSD 48a is associated with a hard disk having a capacity smaller than that of the failed hard disk), this means that data migration from SOSD 56 to new OSD 48a is not possible, and the method then goes to Step 90 in which the whole storage space in the cluster is rebalanced using conventional methods.

However, if it is determined in Step 84 that the size of SOSD 56 is smaller than or equal to that of the new OSD 48a, then the method proceeds to Step 86 in which all the PGs and/or vPGs in the SOSD 56 are migrated to the new OSD 48a and ultimately to the new storage device. FIG. 6 best illustrates such migration, in which PG 44a and PG 44b in SOSD 56, as well as vPG 54c and vPG 54d in SOSD 56 are all migrated to the new OSD 48a. It should be noted that migrating PGs and vPGs from SOSD 56 to the new OSD 48a is faster than inter-host data transmission since the latter requires a network and consumes bandwidth, whereas the former needs only a local data exchange for example through a PCIe controller. Once all the PGs and/or vPGs in SOSD 56 have been migrated to the new OSD 48a, then SOSD 56 has finished its jobs, and in Step 88 SOSD 56 will be deleted from Host 52.

Next, in Step 92 the distributed data storage system checks if there is any remaining vPGs in the new OSD 48a that needs to be backfilled from external hosts (e.g. Host 58). In the case shown in FIG. 6, vPG 54c and vPG 54d in the new OSD 48a still have to be backfilled. If there is still vPGs in the new OSD 48a to be backfilled, then the method goes to Step 94 to continue PG backfilling when the cluster workload is smaller than the threshold as described above. If all vPGs have been backfilled, then the method ends. Steps 92 and 94 are the same as Steps 76 and 74 in FIG. 8, or at least part of the latter. The difference is that Steps 92 and 94 in FIG. 9 refer to operations on the data backfilling to the new OSD 48a but in FIG. 8 the Steps 76 and 74 can either be conducted on SOSD 56 or on the new OSD 48a. In this way, the as the data replication happens in the same Host 52, the map of the cluster, the monitor and the map of OSDs are all kept the same, which avoids additional and unwanted calculation and data movement.

Figure 10:
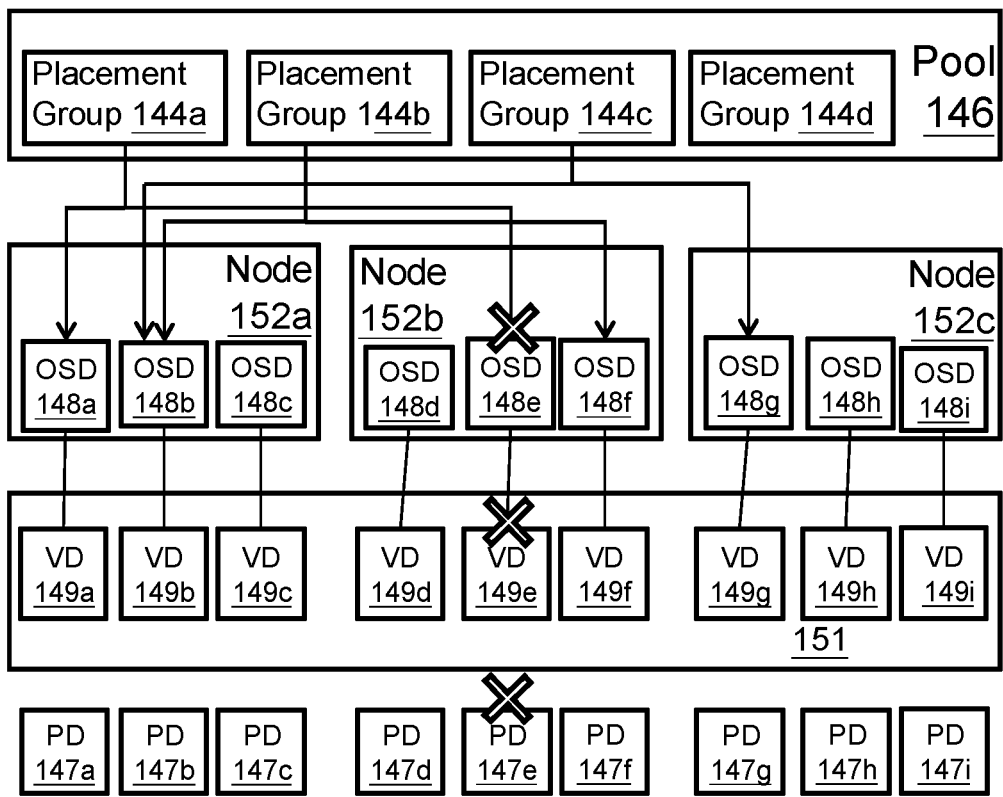
FIG. 10 is a schematic block diagram illustrating one embodiment of an architecture of a distributed data storage system and that one OSD is failed due to the failure of a PD.

Turning to FIG. 10, in another embodiment of the invention a distributed data storage system combines one software defined distributed storage (e.g. Ceph as mentioned previously) with another one (e.g. Intel® Rack Scale Design ("RSD") architecture). The RSD is a software defined infrastructure that can be dynamically provisioned across computing, network and storage resources and the switching between these resources are implemented using a PCIe switch. Upstream ports of the PCIe switch connect to compute nodes, and downstream ports of the PCIe switch connect to the resources, for example physical hard disks in the case of storage resources. The principles of the RSD are well-known in the art and will not be described in further details here.

As shown in FIG. 10, the distributed data storage system contains a pool 146 containing PG 144a, PG 144b, PG 144c and PG 144d. Each one of PG 144a, PG 144b, PG 144c and PG 144d involves two or more OSDs, including a primary OSD and a secondary OSD, and optionally tertiary OSDs. In particular, PG 144a involves OSD 148a in Node 152a, and OSD 148e in Node 152b. PG 144b involves OSD 148b in Node 152a, and OSD 148f in Node 152b. PG 144c involves OSD 148b in Node 152a, and OSD 148g in Node 152c. In the case of PG 144a, OSD 148a is the primary OSD and OSD 148e is the secondary OSD. Each one of the Nodes 152a, 152b and 152c contains multiple OSDs, which are 148a-148c, 148d-148f, and 148g-148i respectively. One can see that the same OSD 148b is used by two different PGs 144b, 144c at the same time, and in other words OSD 148b hosts multiple PGs.

Each OSD is a daemon for an underlying OSD device and in this sense the OSD is a virtual disk manager for the underlying OSD device such as a physical disk. For example, OSD 148a is a daemon for Virtual Drive ("VD") 149a. The VDs 149a-149i are created and hosted in a PCIe switch 151. The VDs are connected through a plurality of Virtual Functions ("VF," not shown) to upstream OSDs, and the VFs allow a switching of VDs so that one or more VDs may be connected to any OSD at the same time. On the downstream side each VD is connected to a corresponding Physical Disk ("PD"), for example VD 149a is connected to PD 147a. There are in total nine PD 147a-147i in FIG. 11.

However, it should be noted in variations of the embodiments multiple VDs may be involved with a same PD, depending on the storage configuration in the PCIe switch 151.

Figure 11:
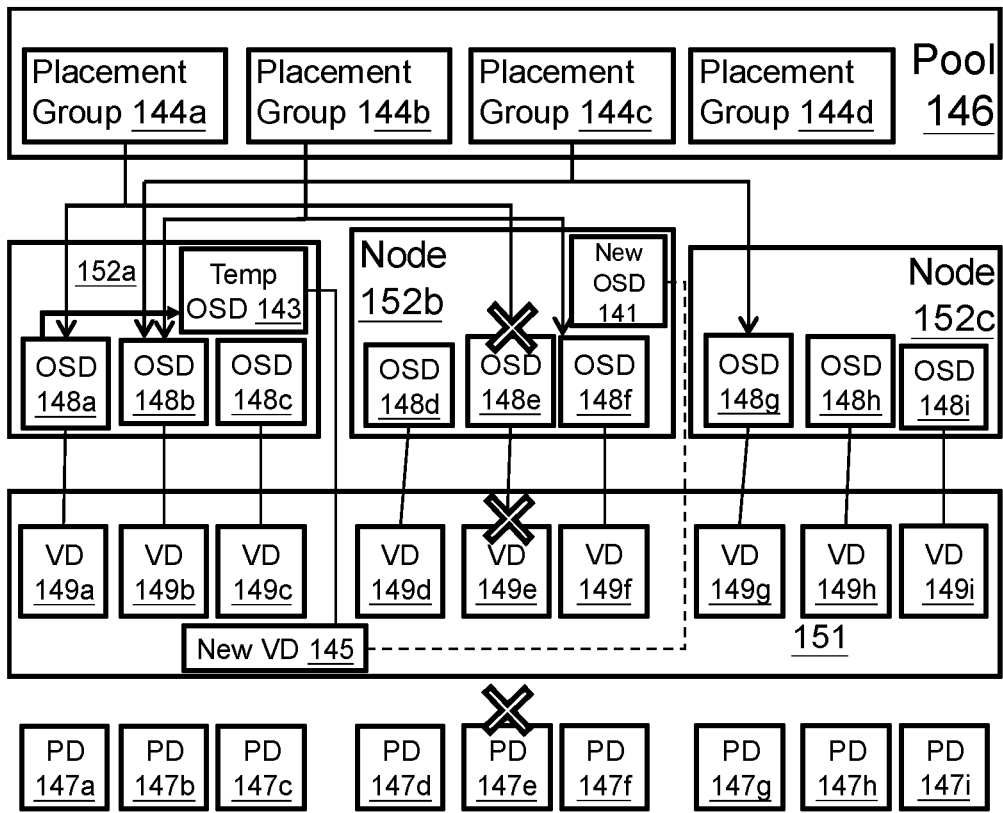
FIG. 11 is a schematic block diagram illustrating one embodiment of the distributed data storage system of FIG. 10 which involves a new VD, a new OSD and a temp OSD.
Figure 12:
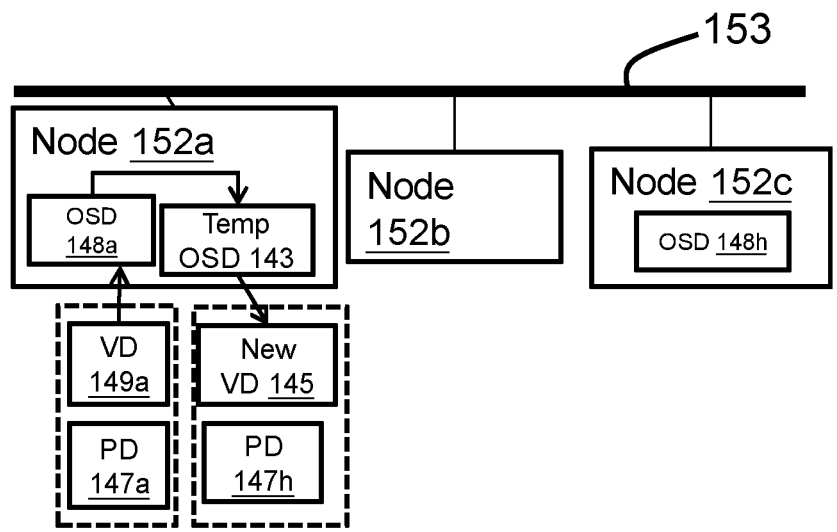
FIG. 12 is a simplified illustration of the data flow in FIG. 11.
Figure 13:
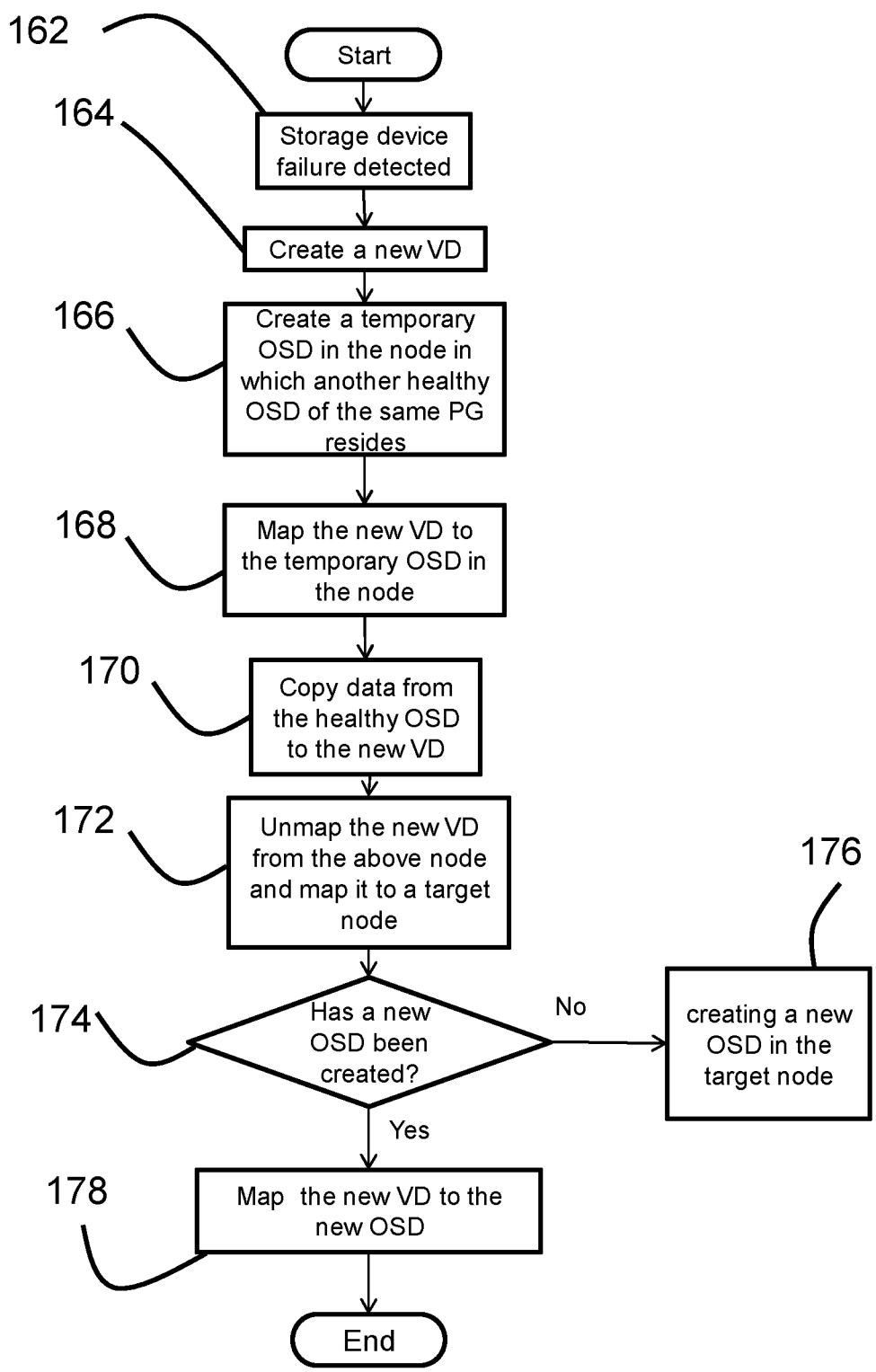
FIG. 13 is a schematic flow chart diagram illustrating one embodiment of a data recovery method in the system shown in FIGS. 11-12.

FIGS. 10-12 illustrate changes of the components in the distributed data storage system where there is a disk failure happened, and the corresponding data recovery mechanism is illustrated in FIG. 13. In FIG. 13, the recovery process starts in Step 162 when there is storage device failure detected by the distributed data storage system. The failed storage device is assumed to be PD 147e which is associated with VD 149e and in turn OSD 148e in Node 152b, all of which are shown in FIG. 10 as disabled. When OSD 148e is failed as a result of its associated VD 149e and PD 147e failed, in Step 164 the distributed data storage system creates a new VD 145 in the PCIe switch 151, as shown in FIG. 11. The new VD 145 is associated with an existing and available physical disk which is PD 147h in FIG. 11.

Then, in Step 166 a Temp OSD 143 is created in Node 152a to act as a daemon temporarily for the new VD 145. The Temp OSD 143 is created as a simulated management module. Node 152a is chosen here since it contains another healthy OSD 148a that belongs to the same PG 144a to which the failed OSD 148e belongs to. Then in Step 168 the new VD 145 is mapped to Temp OSD 143.

Afterwards, in Step 170 the data stored in PD 147a, and therefore in VD 149a, is copied to the new VD 145 through the OSD 148a and Temp OSD 143, and ultimately to PD 147h. VD 149a is an existing management module for PD 147a. This process is best shown in FIG. 12. The data transmission happened within Node 152a so it avoids potential heavy traffic on the cluster local network 153 which connect all different nodes 152a, 152b and 152c together that would cause an impact on the cluster performance in conventional rebalancing methods. The data replication between OSD 148a and the new OSD 143 within the same Node 152a is also faster as the data transmission only goes through the local PCIe switch 151. In addition, the map of the cluster and the map of OSDs can be kept stable without any additional, unwanted calculation or data movement.

Once the data replication to the new VD 145 is completed, then the new VD 145 will be unmapped from Node 152a, and will be mapped later to a target node in Step 172. The temporary OSD which is Temp OSD 143 is deleted at the same time. The target node is the node in which a new OSD will eventually reside, and in this case the target node is Node 152b since a new OSD will be created in Node 152b to replace the previously failed OSD 148e. The distributed data storage system then checks if a new OSD has been created in Node 152b in Step 174. If not, then the method goes to Step 176 in which a new OSD 141 is created in Node 152b as a permanent management module. This is best shown in FIG. 11. If yes, then in Step 178 the new VD 145 is mapped to the new OSD 141, and the latter starts to take care of the new VD 145. As PG 144a is now back to normal, the data recovery method then ends.

Figure 14:
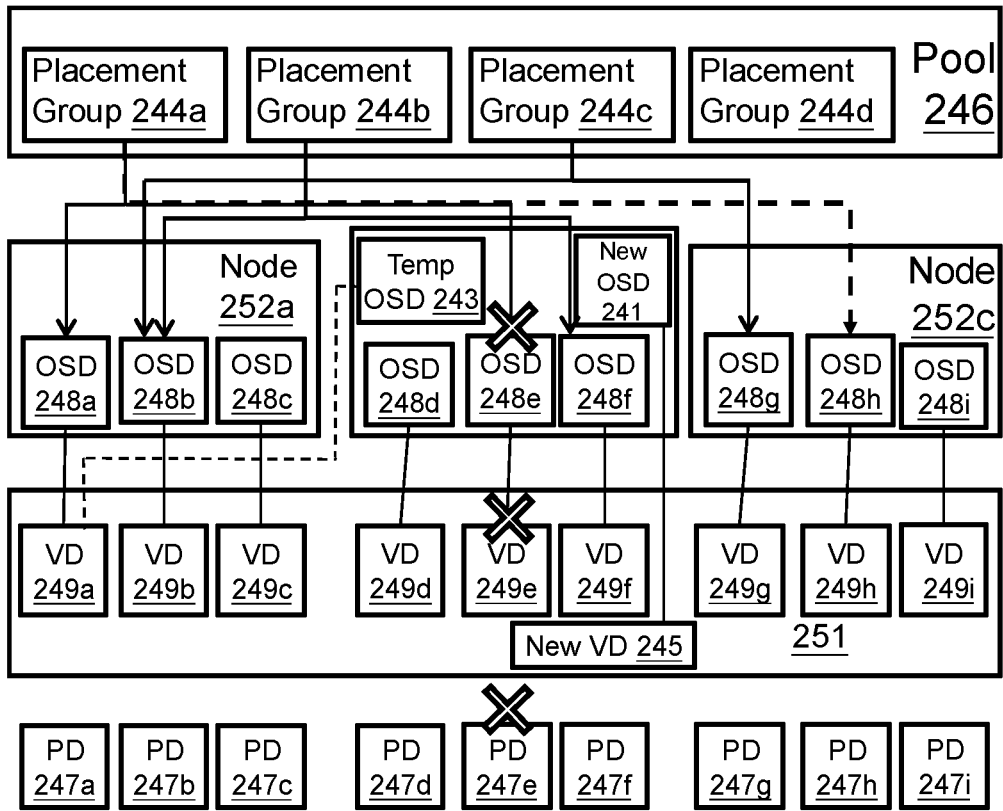
FIG. 14 is a schematic block diagram illustrating another embodiment of a distributed data storage system, when one OSD is failed due to the failure of a PD.
Figure 15:
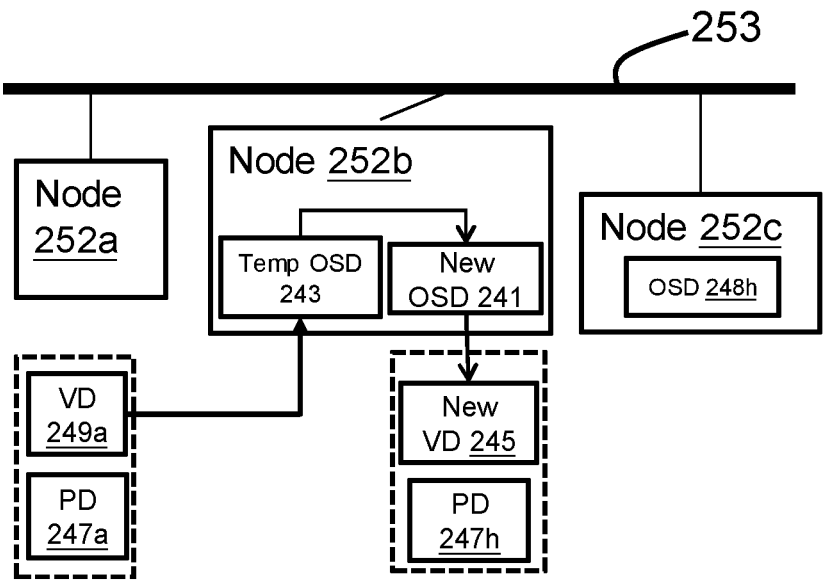
FIG. 15 is a simplified illustration of the data flow in FIG. 14.

Turning now to FIGS. 14 and 15, according to another embodiment of the invention a distributed data storage system contains a pool 246 containing PG 244a, PG 244b, PG 244c and PG 244d. Each one of PG 244a, PG 244b, PG 244c and PG 244d involves two or more OSDs, including a primary OSD and a secondary OSD, and optionally other tertiary OSDs. In particular, PG 244a involves OSD 248a in Node 252a, and OSD 248e in Node 252b. PG 244b involves OSD 248b in Node 252a, and OSD 248f in Node 252b. PG 244c involves OSD 248b in Node 252a, and OSD 248g in Node 252c. In the case of PG 244a, OSD 248a is the primary OSD and OSD 248e is the secondary OSD. Each one of the Nodes 252a, 252b and 252c contains multiple OSDs, which are 248a-248c, 248d-248f, and 248g-248i respectively. One can see that the same OSD 248b is used by two different PGs 244b, 244c at the same time, and in other words the OSD 248b hosts multiple PGs at the same time. Each OSD is a daemon for an underlying OSD device, for example OSD 248a is a daemon for Virtual Drive ("VD") 249a. The VDs 249a-249i are created and hosted in a PCIe switch 251. There are further nine PDs 247a-247i which correspond to VDs 249a-249i respectively.

The structure of the distributed data storage system in FIG. 14 is the same as that in FIG. 11. However, what is different is the method steps of conducting the failed disk recovery. In particular, with reference to FIG. 16, the recovery process starts in Step 262 when there is storage device failure detected by the distributed data storage system. The failed storage device is assumed to be PD 247e which is associated with VD 249e and in turn OSD 248e, all of which are shown in FIG. 14 as disabled. When the OSD 248e is failed as a result of its associated storage device failed, in Step 264 the distributed data storage system creates a new VD 245 in the PCIe switch 251, as shown in FIG. 14. The new VD 245 is associated with an existing and available physical disk which is PD 247h in FIG. 14.

Figure 16:
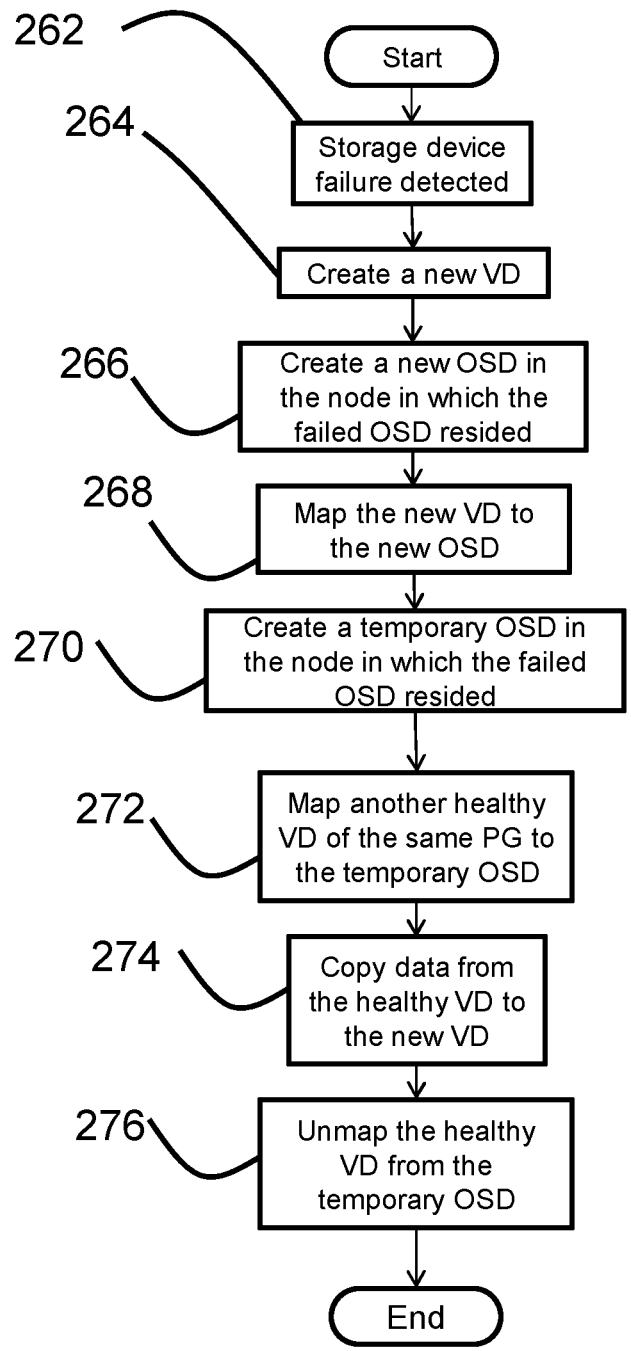
FIG. 16 is a schematic flow chart diagram illustrating one embodiment of a data recovery method in the system shown in FIGS. 14-15.

The method shown in FIG. 16 is different from that shown in FIG. 13 in that in FIG. 16, the new VD 245 is mapped to the same node where the failed OSD resides in. In particular, since the failed OSD 248e resided in Node 252b, in Step 266 a new OSD 241 is created in Node 252b which is intended to be permanent. the new VD 245 is mapped to Node 252b. The New OSD 241 is responsible for data replication for the new VD 245, and then in Step 268 the new VD 245 is mapped to the New OSD 241. Consequently, in Step 270 in the same Node 252b a Temp OSD 243 is created to act as a daemon temporarily for another healthy VD in the same PG as the failed OSD 248e which is VD 249a. VD 249a is then mapped to Temp OSD 243 in Step 272. Afterwards, the data stored in PD 247a, and therefore in VD 249a, is copied to the new VD 245 through the Temp OSD 243 and the New OSD 241, and ultimately to PD 247h. This process is best shown in FIG. 15. The data transmission happened within Node 252a so it avoids potential heavy traffic on the cluster local network 253 which connect all different nodes 252a, 252b and 252c together.

Once the data replication to the new VD 245 is completed, then VD 249a will be unmapped from Node 252b (i.e. from Temp OSD 243). The temporary OSD which is Temp OSD 243 is deleted at the same time. The new VD 245 can be mapped back to Node 252a but this is not shown in FIG. 16. On the other side, the new OSD 241 starts to take care of the new VD 245, and PG 244a is back to normal. The data recovery method then ends.

Figure 17:
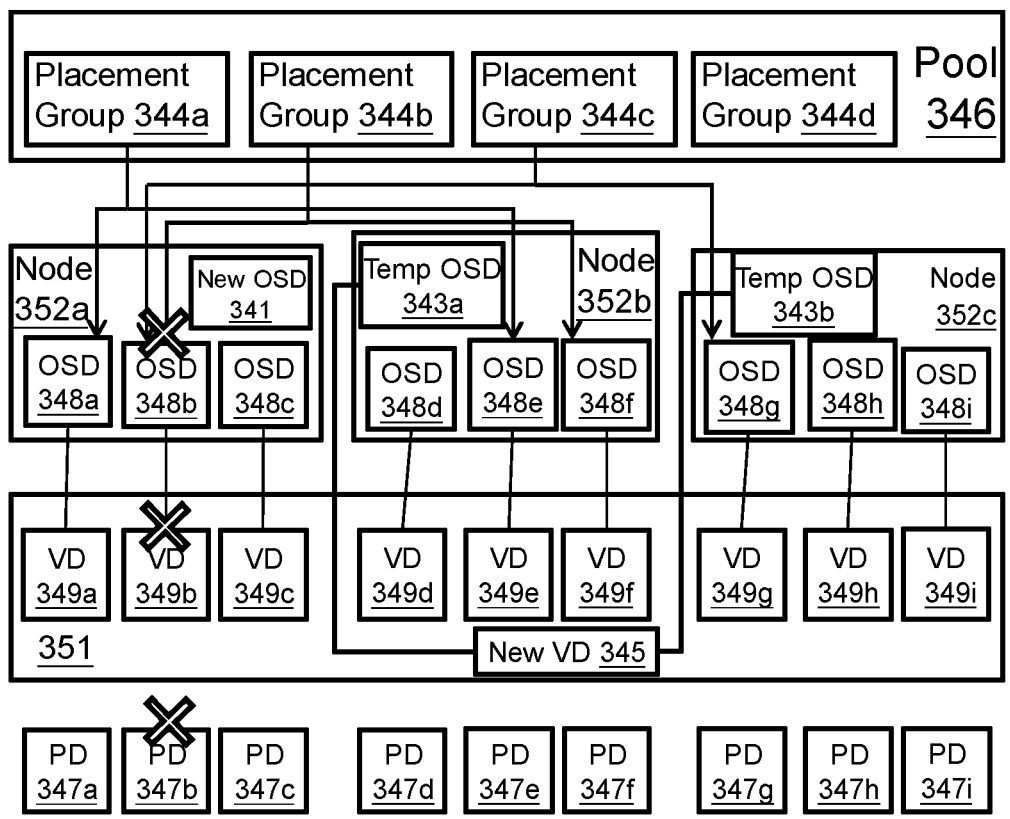
FIG. 17 is a schematic block diagram illustrating another embodiment of a distributed data storage system, when one OSD is failed due to the failure of a PD.
Figure 18:
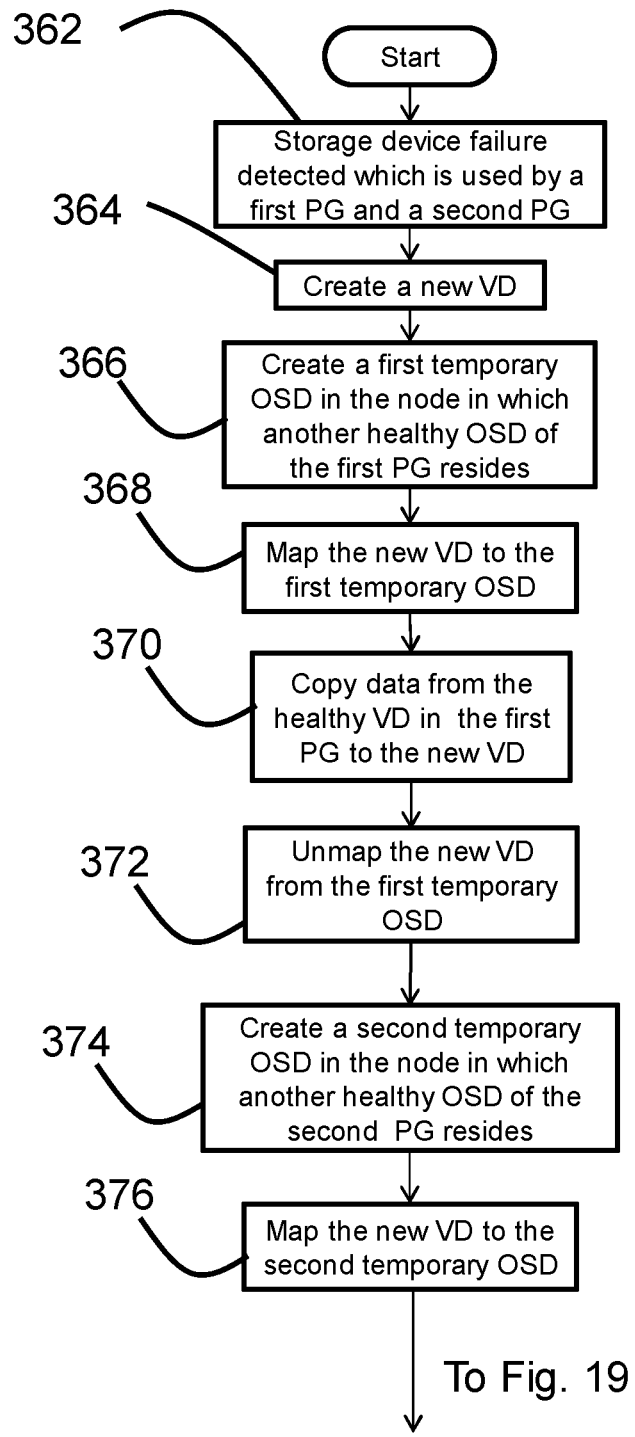
FIG. 18 is a first part of a schematic flow chart diagram illustrating one embodiment of data recovery method in the system shown in FIG. 17.
Figure 19:
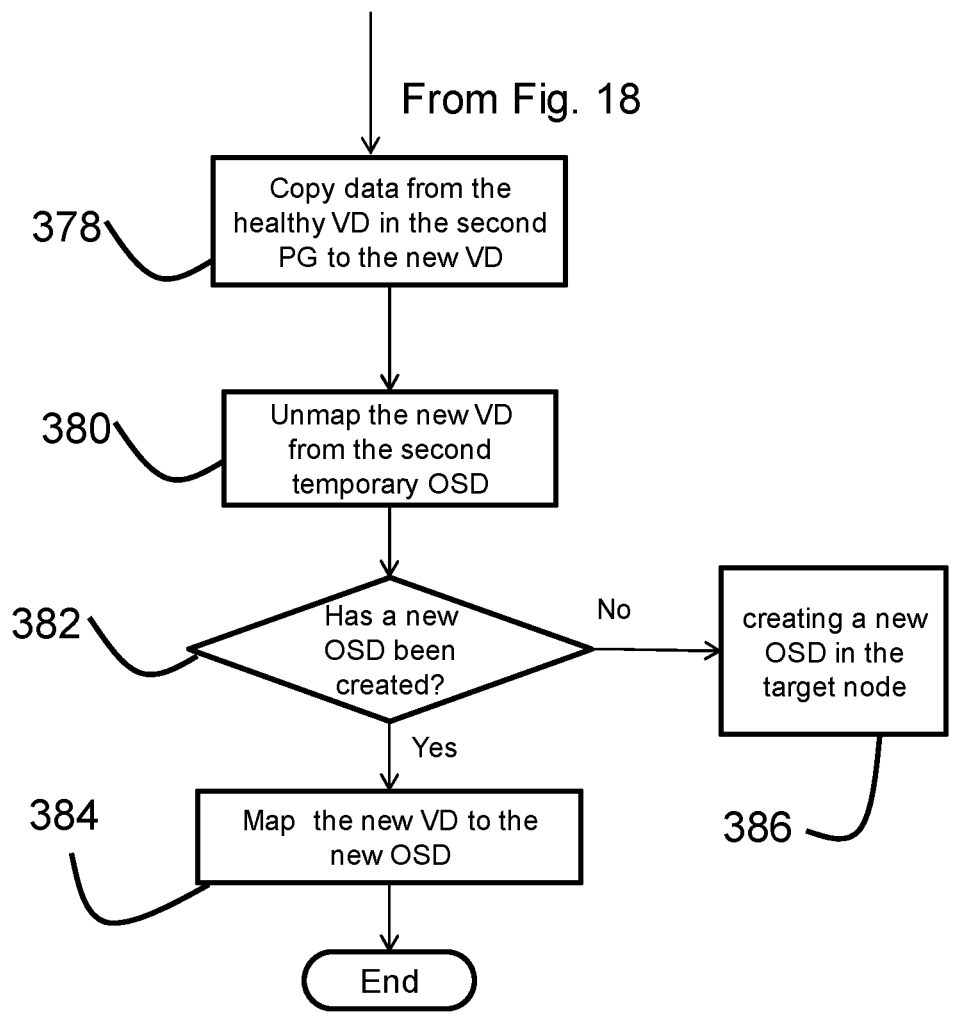
FIG. 19 is a second part of a schematic flow chart diagram illustrating one embodiment of data recovery method in the system shown in FIG. 17.

Turning now to FIGS. 17 and 18, according to another embodiment of the invention a distributed data storage system contains a pool 346 containing PG 344a, PG 344b, PG 344c and PG 344d. Each one of PG 344a, PG 344b, PG 344c and PG 344d involves two or more OSDs, including a primary OSD and a secondary OSD, and optionally other tertiary OSDs. In particular, PG 344a involves OSD 348a in Node 352a, and OSD 348e in Node 352b. PG 344b involves OSD 348b in Node 352a, and OSD 348f in Node 352b. PG 344c involves OSD 348b in Node 352a, and OSD 348g in Node 352c. In the case of PG 344a, OSD 348a is the primary OSD and OSD 348e is the secondary OSD. Each one of the Nodes 352a, 352b and 352c contains multiple OSDs, which are 348a-348c, 348d-348f, and 348g-348i respectively. One can see that the same OSD 348*b* is used by two different PGs 344*b*, 344*c* at the same time, and in other words the OSD 348*b* hosts multiple PGs at the same time. Each OSD is a daemon for an underlying OSD device, for example OSD 348*a* is a daemon for Virtual Drive ("VD") 349*a*. The VDs 349*a*-349*i* are created and hosted in a PCIe switch 351. There are further nine PDs 347*a*-347*i* which correspond to VDs 349*a*-349*i* respectively.

The structure of the distributed data storage system in FIG. 14 is the same as that in FIG. 11. However, what is different is the method steps of conducting the failed disk recovery. In particular, with reference to FIG. 18, the recovery process starts in Step 362 when there is storage device failure detected by the distributed data storage system. The failed storage device is assumed to be PD 347*b* which is associated with VD 349*b* and in turn OSD 348*b*, all of which are shown in FIG. 17 as disabled. It should be noted that as different from the scenarios in FIG. 11 and FIG. 14, the OSD 348*b* in FIG. 17 is used by more than one PGs at the same time, and in particular PG 344*c* and PG 344*b*. When the OSD 348*b* is failed as a result of its associated storage device failed, in Step 364 the distributed data storage system creates a new VD 345 in the PCIe switch 351, as shown in FIG. 17. The new VD 345 is associated with an existing and available physical disk which is PD 347*h* in FIG. 17.

As the failed OSD 348*b* was used by PG 344*c* and PG 344*b* at the same time, a data replication method similar to that in previous embodiments has to be performed for each of the PG 344*c* and PG 344*b*. In the method shown in FIG. 18, firstly PG 344*b* will be dealt with. In Step 366 a first Temp OSD 343*a* is created in Node 352*b* to act as a daemon temporarily for the new VD 345. Node 352*b* is chosen here since it contains another healthy OSD 348*f* that belongs to PG 344*b*. Then in Step 368 the new VD 345 is mapped to Node 352*b* and in particular to the first Temp OSD 343*a*. Afterwards, in Step 370 the data stored in PD 347*f*, and therefore in VD 349*f*, is copied to the new VD 345 through the OSD 348*f* and the first Temp OSD 343*a*, and ultimately to PD 347*h*.

Once the above data replication is finished, then PG 344*c* will be dealt with. In Step 372 the new VD 345 is unmapped from the first Temp OSD 343*a*. The first temporary OSD which is Temp OSD 343*a* is deleted at the same time. In Step 374 a second Temp OSD 343*b* is created in Node 352*c* to act as a daemon temporarily for the new VD 345. Node 352*c* is chosen here since it contains another healthy OSD 348*g* that belongs to PG 344*c*. Then in Step 376 the new VD 345 is mapped to Node 352*c* and in particular to the second Temp OSD 343*b*. Afterwards, in Step 378 the data stored in PD 347*g*, and therefore in VD 349*g*, is copied to the new VD 345 through the OSD 348*g* and the second Temp OSD 343*b*, and ultimately to PD 347*h*.

After Step 378 is completed, the new VD 345 now contains both data from OSDs 348*g* and 348*f*. Then in Step 380 the new VD 345 will be unmapped from Node 352*c* in Step 382, and will be mapped later to a target node. The second temporary OSD which is Temp OSD 343*b* is deleted at the same time. The target node is the node in which a new OSD will eventually reside, and in this case the target node is Node 352*a* since a new OSD will be created in Node 352*a* to replace the previously failed OSD 348*b*. The distributed data storage system then checks if a new OSD has been created in Node 352*a* in Step 382. If not, then the method goes to Step 386 in which a new OSD 341 is created. This is best shown in FIG. 17. If yes, then in Step 384 the new VD 345 is mapped to the new OSD 341 and the latter starts to take care of the new VD 345. As a result, both PG 344*b* and 344*c* are back to normal. The data recovery method then ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for recovering data on a failed storage device, the method comprising:
   detecting that a first storage device has a failure;
   creating a simulated management module, the simulated management module linked with a second storage device;
   creating a virtual pointer associated with the simulated management module, the virtual pointer pointing to a third storage device which stores the replica of said data;
   after creating the virtual pointer, writing a replica of at least some of the data as stored in the first storage device to the second storage device;
   creating a permanent management module;
   deleting the virtual pointer if an entirety of the replica of said data associated with the virtual pointer has been written to the second storage device in the writing step; and
   deleting the simulated management module.

2. The method of claim 1, wherein writing a replica of at least some of the data comprises the replica of said data from the third storage device being written to the second storage device.

3. The method of claim 2, wherein writing a replica of at least some of the data is performed in response to a communication network connected between the second storage device and the third storage device having a workload less than a threshold.

4. The method of claim 1, wherein the second storage device and the third storage device reside in different hosts of a storage cluster, wherein the first storage device and the second storage device reside in a same host.

5. The method of claim 1, further comprising linking a fourth storage device with the permanent management module.

6. The method of claim 5, further comprising migrating the replica of said data from the second storage device to the fourth storage device after writing the replica of said data to the second storage device has commenced.

7. The method of claim 5, further comprising writing the replica of said data from a third storage device, which stores the replica of said data, to the fourth storage device after the simulated management module is deleted.

8. The method of claim 1, wherein the simulated management module and the permanent management module correspond to Object Storage Daemons ("OSDs"), wherein the first storage device and the second storage device correspond to Placement Groups ("PGs").

9. The method of claim 1, further comprising creating a virtual disk manager associated with the second storage device, wherein the writing the replica of said data comprises copying the replica of said data stored in the third storage device to the virtual disk manager via the simulated management module and then to the second storage device.

10. The method of claim 9, wherein the simulated management module and the permanent management module reside in different nodes and further comprising:
linking the virtual disk manager to the simulated management module; and
copying the replica of said data further comprises transmitting the replica of said data from the third storage device to the virtual disk manager via an existing management module associated with the third storage device and then the simulated management module.

11. The method of claim 10, further comprising unlinking the virtual disk manager from the simulated management module in response to completion of transmitting the replica of said data.

12. The method of claim 11, further comprising linking the virtual disk manager to the permanent management module in response to completion of unlinking the virtual disk manager from the simulated management module.

13. The method of claim 11, wherein deleting the simulated management module is in response to completion of unlinking the third storage device from the simulated management module.

14. The method of claim 9, wherein the simulated management module and the permanent management module reside in a same node and further comprising:
linking the virtual disk manager to the permanent management module;
linking the third storage device to the simulated management module; and
copying the replica of said data further comprises transmitting the replica of said data from the third storage device to the virtual disk manager via the simulated management module associated with the third storage device and then the permanent management module.

15. The method of claim 14, further comprising unlinking the third storage device from the simulated management module in response to completion of transmitting the replica of said data from the third storage device to the virtual disk manager.

16. A program product comprising a non-transitory computer readable storage medium that stores code executable by a processor, the executable code comprising code to:
detect that a first storage device has a failure;
create a simulated management module, the simulated management module linked with a second storage device;
create a virtual pointer associated with the simulated management module, the virtual pointer pointing to a third storage device which stores the replica of said data;
after creating the virtual pointer, write a replica of at least some of the data as stored in the first storage device to the second storage device;
delete the virtual pointer if an entirety of the replica of said data associated with the virtual pointer has been written to the second storage device in the writing step; and
delete the simulated management module.

17. An apparatus comprising:
a processor;
a memory that stores code executable by the processor to:
detect that a first storage device has a failure;
create a simulated management module, the simulated management module linked with a second storage device;
create a virtual pointer associated with the simulated management module, the virtual pointer pointing to a third storage device which stores the replica of said data;
after creating the virtual pointer, write a replica of at least some of the data as stored in the first storage device to the second storage device;
create a permanent management module;
delete the virtual pointer if an entirety of the replica of said data associated with the virtual pointer has been written to the second storage device in the writing step; and
delete the simulated management module.

* * * * *